(12) United States Patent
Campbell et al.

(10) Patent No.: US 6,408,313 B1
(45) Date of Patent: Jun. 18, 2002

(54) DYNAMIC MEMORY ALLOCATION BASED ON FREE MEMORY SIZE

(75) Inventors: David G. Campbell; Eric R. Christensen, both of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/212,173

(22) Filed: Dec. 16, 1998

(51) Int. Cl.[7] .......................... G06F 17/30; G06F 12/02
(52) U.S. Cl. ....................... 707/205; 711/118; 711/170
(58) Field of Search ............................. 707/3, 205, 2.3, 707/200, 206; 711/118–132, 133, 159, 170–173

(56) References Cited

U.S. PATENT DOCUMENTS

| | | | | |
|---|---|---|---|---|
| 4,805,097 A | * | 2/1989 | De Sanna | 711/206 |
| 4,812,981 A | * | 3/1989 | Chan et al. | 711/202 |
| 4,961,139 A | * | 10/1990 | Hong et al. | 707/1 |
| 5,517,643 A | * | 5/1996 | Davy | 709/105 |
| 5,566,315 A | * | 10/1996 | Milillo et al. | 711/113 |
| 5,668,987 A | * | 9/1997 | Schneider | 707/3 |
| 5,893,920 A | * | 4/1999 | Shaheen et al. | 711/133 |
| 6,128,713 A | * | 10/2000 | Eisler et al. | 711/159 |
| 6,256,645 B1 | * | 7/2001 | Mundy | 707/205 |
| 6,286,016 B1 | * | 9/2001 | Heller et al. | 707/206 |

\* cited by examiner

Primary Examiner—Maria N. Von Buhr
(74) Attorney, Agent, or Firm—Woodcock Washburn LLP

(57) ABSTRACT

A dynamic cache management mechanism determines the amount of memory available from a system on which a memory intensive application is running and dynamically manages the amount of cache for which real memory is associated or committed by the system. A background thread periodically queries the operating system to determine how much memory is available for use by applications. If the amount of memory, as identified in a free list is above a predetermined threshold, the application requests more memory for its use. If below the predetermined threshold, the application gives memory back to the operating system. The threshold used by the application to expand and shrink the memory it uses based upon system demand for memory.

21 Claims, 4 Drawing Sheets

DYNAMIC MEMORY ALLOCATION BASED ON FREE MEMORY SIZE

FIELD OF THE INVENTION

This invention relates generally to the field of memory management and in particular to a dynamic cache management mechanism for a computer program.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright®1998, Microsoft Corporation, All Rights Reserved.

BACKGROUND

Many application programs are configured at the time they are initially loaded and set up to run on a computer system. The amount of memory available for use by the program is one of the things that is configured at set up time. It is sometimes difficult for a computer user to anticipate how much memory an application will require in order to run, not to mention run efficiently and quickly. Some applications, such as data base language servers run faster only with a significant amount of memory, referred to as a buffer or cache. The cache is used to store both executable code related to running the program as well as data that is used by the program, in this case, multiple tables of a database. Further, the amount of data that such a program is processing affects the amount of memory needed to run well. The amount of data that the program is processing can also vary over time, thus increasing or decreasing the amount of memory needed to run well. The amount of memory configured for use by such a program also depends on the size of the machine and amount of memory available on the machine. Some have very large amounts of memory, while others have less. Configuring the program that likes more memory with too much or too little memory for the system on which it is running can result in suboptimal performance of the system.

Once an application is allocated a certain amount of memory in the system to use, the operating system takes over management of the physical main memory. It commits real or physical main memory to the memory of the application. Many times, the operating system must take real memory from one application and associate it with a buffer for another application. It usually takes that memory in an amount equal to one or more pages, where a page is a certain amount of data, such as four kilobytes. When it takes a page to give to another system, it must write the data on that page to secondary storage, which is usually slower than the main memory. When the application needs to access that data again, it must first be paged back in again, which can take a large amount of time as compared to the speed at which programs normally run with data in memory.

There is a need to avoid such paging as much as possible for selected applications, such as data base applications, where many users expect and demand sub second response times. If the data, or code to provide the functionality requested by a user or another program is not currently in the memory, it significantly degrades the performance of the application. Again, suboptimal performance can result if too little memory is available to a memory intensive application because data must be continually retrieved from secondary storage. However, suboptimal performance can also result from a memory intensive application being set up with too much memory, since the operating system will start paging out the data needed by the application, again resulting in data being continually retrieved from secondary storage.

There is a need for a mechanism to better manage the amount of memory that is available to application programs. Such a mechanism should be simple to use, and not require a user, who may not have relevant experience and ability, to set up or modify the memory resources allocated to the programs. Further, the resources used by the program should not adversely affect the overall performance and integrity of the computer system on which the program is running.

SUMMARY OF THE INVENTION

A dynamic cache management mechanism determines the amount of memory available from a system on which a memory intensive application is running and dynamically manages the amount of cache for which real memory is associated or committed by the system.

In one embodiment, the memory intensive application uses a background thread to periodically query a memory manager, normally a part of an operating system, to determine how much memory is available for use by applications. If the amount of memory, as identified in a free list is above a predetermined threshold, the application requests more memory for its use. If below the predetermined threshold, the application gives memory back to the operating system so it may be used by the operating system or other applications and programs. A temporal average of the number of available pages from the operating system is used to prevent oscillation of the size of the memory allocated to the application.

The threshold used by the application is determined to be a desired amount above a known basic operating system desired amount. The difference between the threshold and the reserved amount is referred to as an excess over the desired amount. The existence of the excess allows other applications to also obtain memory resources. This allows other applications the ability to run while at the same time maximizing the amount of memory allocated to the application using the mechanism.

In one embodiment, the application comprises a database system. Dynamically expanding or contracting the database system cache based upon system demand allows the database system data cache to expand and shrink based upon system demand for memory, optimizing the use of physical system memory and providing better performance of the database. This benefit is provided even though the size of the database being used changes over time. Users of the application need not be familiar with the complexities involved in configuring the memory to meet the requirements of the database system. Further, other applications will also run efficiently because the excess memory will be made available by the memory intensive application for their use as the demands on the system resources expand and contract over time.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes an example personal computer system or server on which the present invention may be stored and executed. The second section describes the invention as embodied in a computer program and how it is utilized to provide a database system a large amount of memory while still allowing other application to obtain suitable memory for operation. Both block diagrams and flowcharts are used to describe the functionality of the invention. A third and final section is a conclusion which describes some potential benefits and describes further alternative embodiments.

Hardware and Operating Environment

Figure 1:
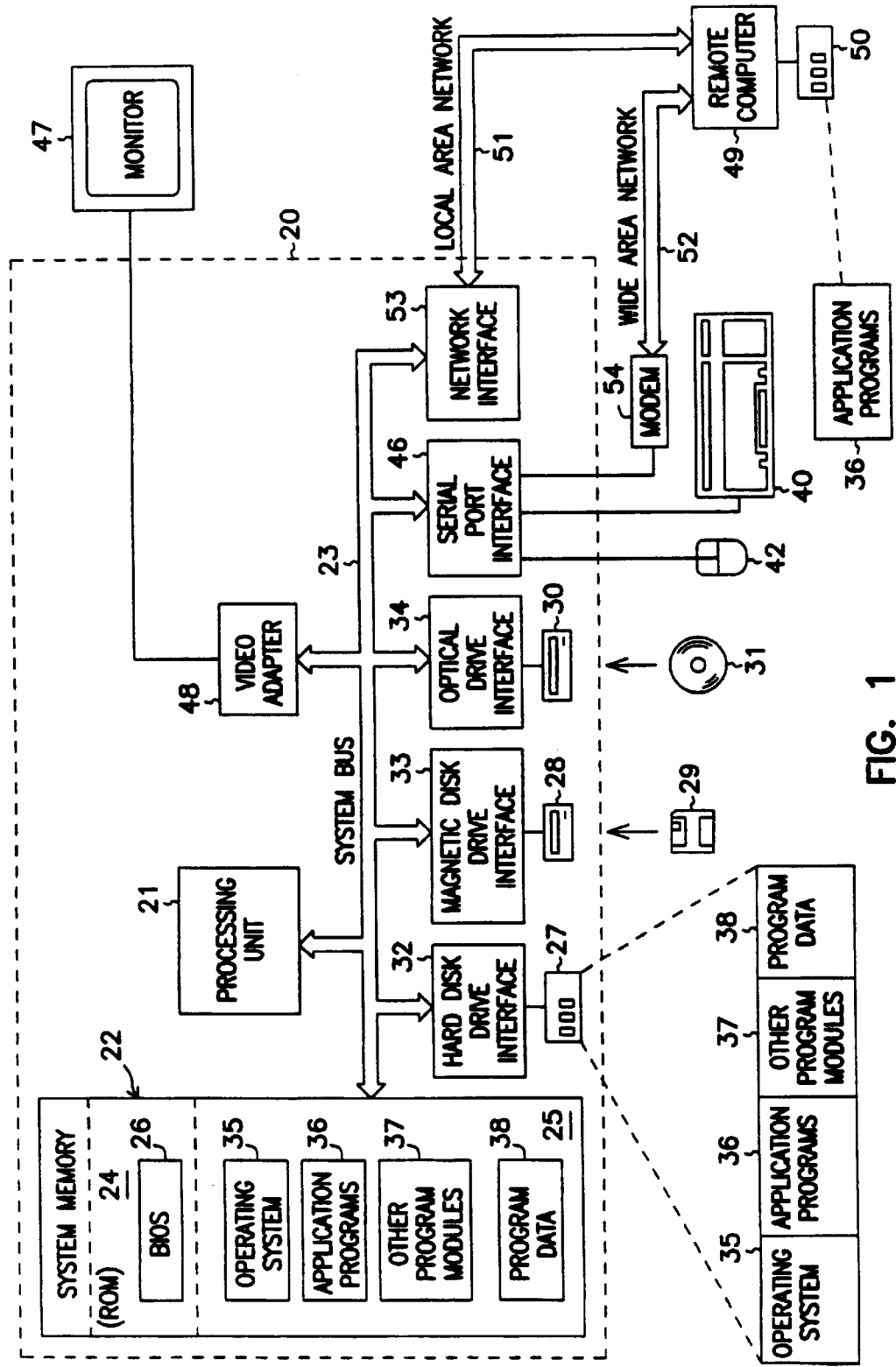
FIG. 1 is a block diagram of a computer system on which the present invention may be implemented.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Figure 2:
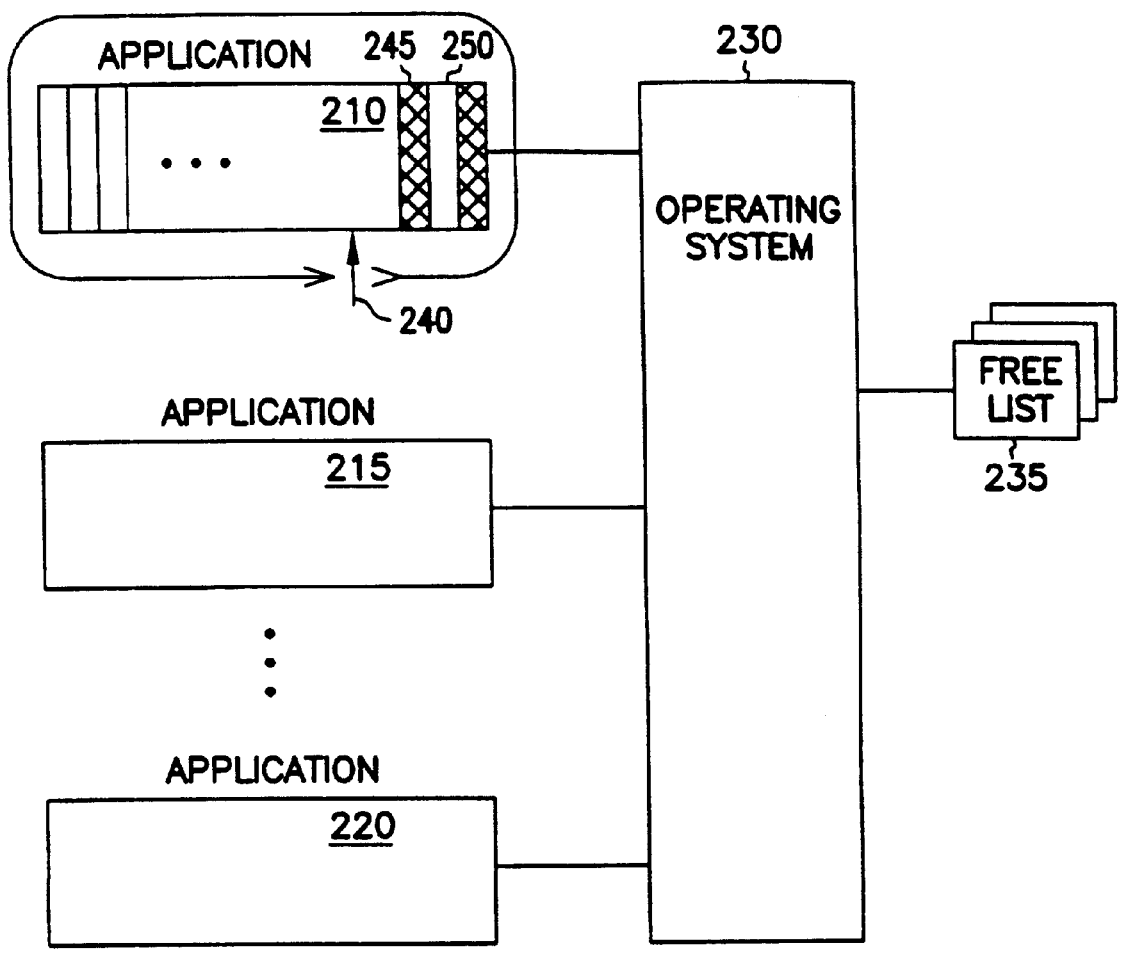
FIG. 2 is a block diagram representation of the memory requirements and management of multiple applications running on the system of FIG. 1.

FIG. 2 is a block representation of memory allocated to multiple applications 210, 215 and 220 by an operating system 230, all of which are running on personal computer 20 in FIG. 1, which may be functioning as a server or stand alone personal computer. The operating system 230 maintains a free list 235 of pages of main memory which are immediately available for use by applications 210, 215 and 220, as well as other applications represented by the dots between application 215 and 220. All of the applications are competing for the memory.

In one embodiment, the operating system 230 is Windows NT(R) and application 210 is SQL Server by Microsoft(R). Generally, the more cache or buffer memory that can be provided to SQL Server, the better it runs. Application 210 may be another type of application that runs better with more memory as well. Operating system 230 manages the association of physicl memory with virtual memory which is managed by each of the applications 210, 215 and 220. Most applications are set up with a predetermined amount of virtual memory. The operating system then associates selected physical or real memory with the virtual memory. During operation, the operating system will keep track of the amount of free real memory as identified in free list 235, and will start paging out memory to secondary storage, such as disk drive if the amount of memory in the free list falls below four megabytes (4M) an amount the operating system desires to keep in reserve. As mentioned in the background section, this can cause a degradation of performance, most notably response times perceived by a user.

The application 210 also comprises a pointer 240 which circulates through pages of memory, two of which are labeled as 245 and 250. Page 245 is one which has been decommitted. In other words, it does not have a real memory area associated with it. Page 250 however has been committed, and thus has real memory associated with it.

Application 210 runs best with as much memory as possible. To ensure that it obtains a large amount of memory without running the risk of taking so much memory that the operating system starts paging it out, a background thread, referred to as a lazy writer thread wakes up and runs periodically. In one embodiment, it is run once every second, or at least once every second but more often if the system is busy as desired.

Figure 3:
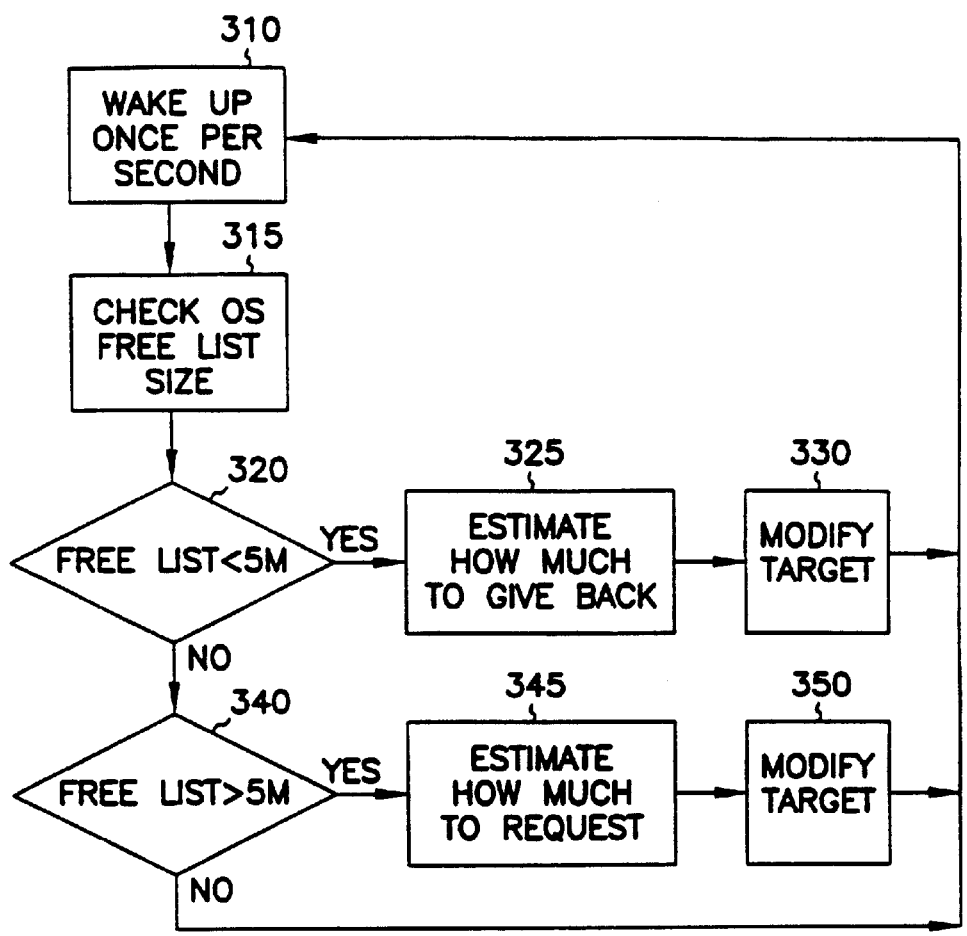
FIG. 3 is a flow chart of the operation of a memory management thread in one of the applications running on the system of FIG. 1.
Figure 4:
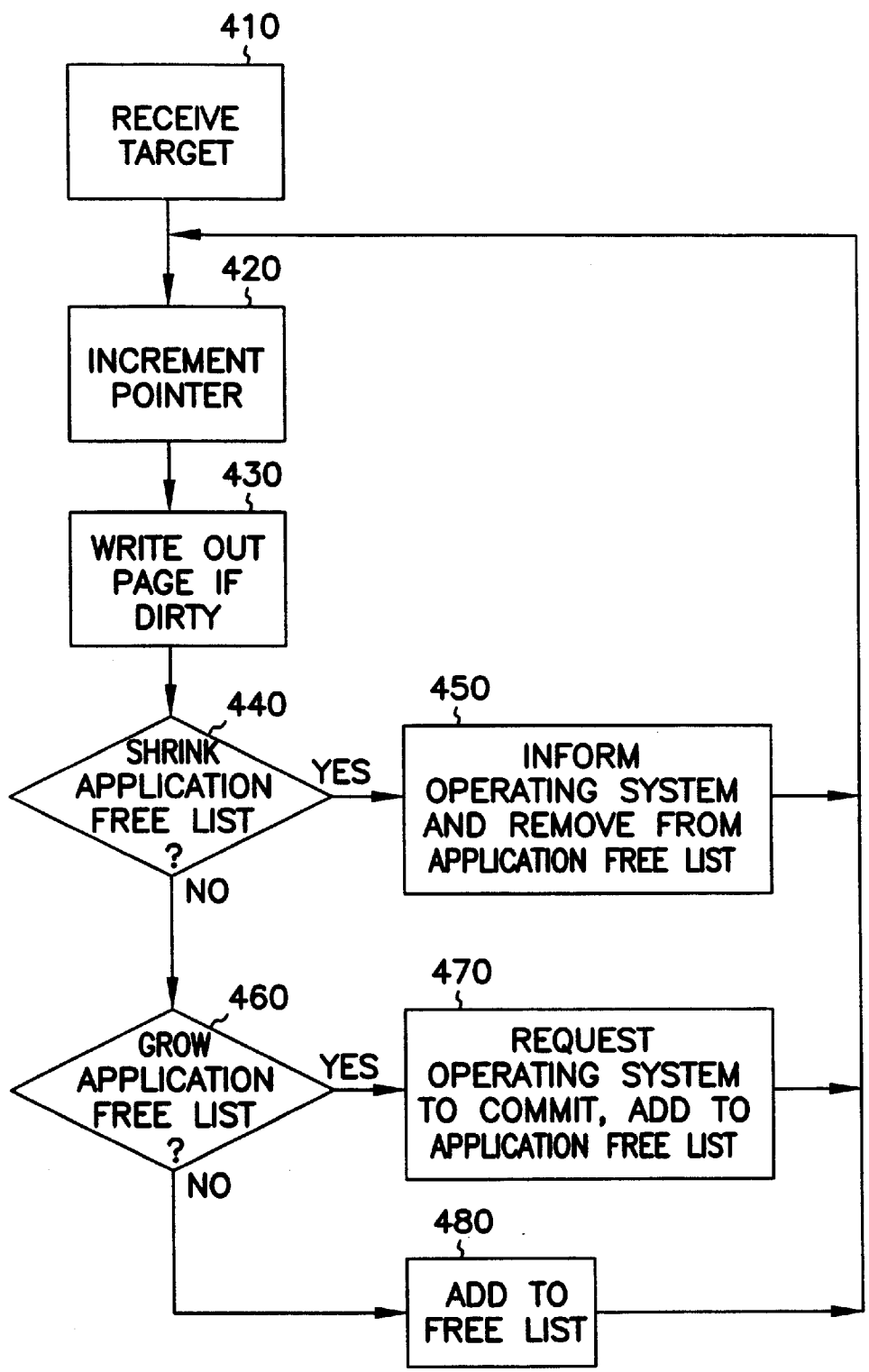
FIG. 4 is a flow chart of the operation of a memory manager for an application implementing the present invention.

The flow of the lazy writer thread is shown in the flowchart of FIG. 3. The thread may be written in one of many known high level languages such as C and C++ as desired. At 310, a block represents the thread waking up and running periodically, such as once every second in one embodiment. The period may be modified as is well known in the art. At 315, the thread queries the operating system to determine how much memory is available, as may be reflected in the free list that is maintained by the operating system, or may be provided by some other construct in the operating system or memory manager. This can be done by issuing a query to the operating system referred to as a GlobalMemoryStatus check in NT, but may use other methods or interfaces in other systems having different operating systems. The operating system will return with a number representing the current size of the free list. In further embodiments, the operating system will periodically provide the current size representation without prompting, or may provide it whenever the operating system detects that the number of free pages is outside a predetermined range. In one embodiment, the operating system issues a "call back" to registered applications to have them return memory to the operating system.

When the operating system returns with a representation of the number of free pages available for applications, the lazy writer thread determines the length of this list and then determine whether committed memory for the application should grow or shrink. It sets a target number to reach by taking the current size and subtracting 5M in one embodiment. By selecting a threshold of 5M, an excess of 1M (5M–4M) is created which allows other applications to use memory without necessarily forcing the operating system into paging. If negative, as determined at block 320, an estimate of the number of pages to give back, or decommit is made at 325. A target size is then set at 330 and provided to memory management of the application. If the free list size is greater than 5M as determined at 340, an estimate is made of how much more memory can be committed to the application at 345 and the target is adjusted or modified at 350 and provided to the memory management of the application. After the target is modified, either made smaller or larger at 330 and 350 respectively, the thread returns to 310 to wake up again later.

In one embodiment, the estimations of how much to give back or how much to request are based on a running average of the operating system free list size. The previous size is added to the current size and divided by two to obtain an average. The average may be taken over more than two samples, and may also include different weightings of the samples. The purpose of the averaging is to minimize large swings back and forth in memory size.

The actual growing and shrinking of the application's buffer or cache is controlled by the memory or buffer manager of the application, in this case, the SQL Server. After the thread determines the target value for growing or shrinking, it is made available to the application buffer manager which manages the selection of which pages in the buffer are to be committed and decommitted. Such management is based on a derived shrink count or grow count based on the target and number of committed pages in the buffer. A page is said to be committed by the operating system when real memory is associated with the page in the buffer. Likewise, it is decommitted when the operating system has no associated real memory for the page in the buffer.

Pseudocode representative of the functions provided by the memory manager of the application buffer based on the target comprises:

```
While (application free list too small)
{
    Advance to next buffer.
    If (committed)
    {
        Write, if dirty.
        If (should shrink)
        {
            Return page to OS
            Decrement shrink count
        }
        else
            Put page on application free list
    }
    else
    {
        If (should grow)
        {
            Ask OS to commit page
            Put page on application free list
            Decrement grow count
        }
    }
}
```

The buffer is fixed in virtual size, but is managed with respect to the number of real memory pages that are committed to it. By having some pages in the buffer that are not committed, the real memory that might have been used in association with the uncommitted memory is available for other applications. As can be seen from the pseudocode, the memory manager keep incrementing the pointer 240 through the cache/buffer, while adding and subtracting pages from an application specific internal free list, referred to as the SQL free list when the application is SQL Server.

The SQL free list is managed to a certain size. To grow the free list, pages are either reused and added to the free list, written out to disk and then added to the free list, or requested from the operating system and then added to the free list. When the application needs another page, the SQL memory manager can either add one from its free list, create one by writing it out and then adding it, or going to the operating system free list to have real memory committed to the page that the pointer is currently pointing to.

After the pointer 240 is incremented, if it advances to an empty uncommitted page as represented at 245, and it is determined by reference to the target that the committed memory for the application can grow, then the operating system is asked to populate it with real memory if not already committed. This is done by issuing an existing VirtualAlloc documented call in Windows NT. Such commands may be easily implemented in other operating systems, if not currently implemented.

If the pointer points to a page that is already in use and committed, it is written out if dirty (a page that has had changes made to data within it, such as the modification or updating of data in a database table) and then added to the SQL free list. If the page is not dirty, it is immediately added to the SQL free list. Thus, if the cache should grow, when the pointer is on a page which has been decommitted, it initiates commitment of real memory to the page. If the cache should shrink, then memory being pointed to is taken off the free list and decommitted by the operating system. In order to decommit a page, if it is a dirty page, it has to be written out to secondary storage prior to initiating decommitment of the page. Prior to this invention, dirty pages were written out, but there was no management of the number of pages committed.

It should be noted that this is just one way of managing the free list of the SQL buffer. There are many other ways which may be used in conjunction with the identification of the optimal size of the operating system free list. One way would entail always go to the operating system to obtain free memory. Still further methods would take into account the expense of retrieving the data that is written out, and if expensive, not adding that page to the free list. Still further methods would not use a pointer, but would otherwise directly keep track of dirty pages and write them out in a FIFO manner or otherwise.

Upon starting of the application, several options are available. The virtual memory assigned to the application is fixed in one embodiment, or may also be varied as needed. In one embodiment, all the virtual memory is associated with real memory, and the lazy writer thread is also initialized. The amount of committed and uncommitted memory will soon reach a steady state, assuming that all the applications on the computer system have fixed resource needs. If not, the memory allocations will dynamically vary with the needs of all the applications on the system. Other methods of starting include committing a fixed or desired amount of memory and then running the thread. The fixed amount of memory can be an average memory that is anticipated will work well with most systems. It could also be a minimum specified amount.

CONCLUSION

A memory intensive application uses a background thread to periodically query a memory manager, normally a part of an operating system, to determine how much memory is available for use by applications. If the amount of memory, as identified in a system free list is above a predetermined threshold, the application requests more memory for its use. If below the predetermined threshold, the application gives memory back to the operating system so it may be used by the operating system or other applications and programs.

The application adjusts the amount of memory used by the application over time to varying work flows, both in the application, and in the overall system. In other words, the memory intensive application manages its own memory as much as possible without the operating system making the decisions as to what to page in and out. This can prevent suboptimal performance resulting from both having too little memory available and from having too much memory, which forces the operating system to page, or deprive other applications from obtaining sufficient memory to operate efficiently.

While the invention has been described in terms of an SQL server, it should be recognized that other memory intensive applications may also be used. The memory manager of the server uses a rotating pointer or clock to manage its memory via a free list, writing out dirty pages as encountered. As discussed, there are many other types of memory management mechanisms that can take advantage of the provision of a representation of a targeted amount of memory to manage to. Further, the determination of the target need not be initiated by a background thread. For instance, the size of the free list could be provided by the operating system directly to the application memory manager.

This application is intended to cover any adaptations or variations of the present invention. It is manifestly intended that this invention be limited only by the claims and equivalents thereof.

We claim:

1. A method of determining an amount of memory to be useable to a computer application, the method comprising:
   determining an amount of memory available in a computer system;
   determining an excess amount of memory; and
   determining a memory target for the computer application for use in managing the application's memory.

2. The method of claim 1 and further comprising:
   initiating by the application, the decommitting of memory if the target is less than a currently used amount of memory by the application.

3. The method of claim 1 and further comprising:
   initiating by the application, the committing of memory if the target is greater than a currently used amount of memory by the application.

4. The method of claim 1 and further comprising:
   initiating the decommitting of memory if the target is less than a currently used amount of memory by the application; and
   initiating the committing of memory if the target is greater than a currently used amount of memory by the application.

5. The method of claim 1 wherein the excess amount of memory is determined to provide sufficient memory to avoid paging of memory.

6. The method of claim 1 wherein determining an amount of memory available comprises the application querying a free list of the computer system.

7. A computer readable medium having computer executable instructions stored thereon for performing the method of claim 1.

8. A computer application having computer executable instructions, comprising:
   a first module for checking a free list of an operating system on which the application is running; and
   a second module for calculating a target memory amount used to define whether the memory committed to an application is to grow or shrink.

9. The application of claim 8 and further comprising a value defining an excess amount of memory for the operating system which inhibits paging.

10. The computer application of claim 8 and further comprising a third module that manages a buffer for the application to the target memory amount.

11. The computer application of claim 10 wherein the third module comprises a free list for the application, referencing pages which are available for use by the application.

12. The computer application of claim 11, wherein the third module requests pages be associated with real memory managed by the operating system and adds such pages to its free list if the target memory amount indicates that the memory for the application may grow.

13. The computer application of claim 11, wherein the third module writes out dirty pages and requests that such pages be decommitted if the target memory amount indicates the memory for the application should shrink.

14. A machine readable medium having instructions stored thereon for causing a computer to perform a method of determining an amount of memory to be useable to a computer application, the method comprising:
   determining an amount of memory available in a computer system;
   determining an excess amount of memory; and
   determining a memory target for the computer application for use in managing the application's memory.

15. A computer system comprising:
   means for checking a free list of memory pages available for use by the computer system;
   means for determining if the amount of memory used by an application should shrink or grow;
   means for managing the memory used by an application independent of system wide memory management responsive to the means for determining the amount of memory; and
   means for committing or decommitting memory to the application responsive to the means for managing the memory used by the application.

16. A method of determining an amount of memory to be committed for use by a computer application, the method comprising:
   querying an operating system to determine the amount of memory available on a free list of memory maintained by the operating'system;
   subtracting a predetermined amount of memory from the amount of memory available on the free list to obtain a target amount for the application;
   shrinking the amount of memory committed to the application if the target amount indicates that the application has too much memory committed by the operating system; and
   growing the amount of memory committed to the application if the target amount indicates that the application can grow.

17. The method of claim 16, wherein querying the operating system is performed periodically.

18. The method of claim 17, wherein querying the operating system is performed at least once per second.

19. The method of claim 16, wherein querying the operating system is performed periodically with a frequency which is a function of overall computer system load.

20. The method of claim 16, wherein the target is a function of more than one query of the amount of memory available on the free list.

21. The method of claim 20, wherein the target is an average of amounts of memory available on the free list from two queries of such amounts.

* * * * *